(12) United States Patent
Mayben

(10) Patent No.: US 7,823,520 B2
(45) Date of Patent: Nov. 2, 2010

(54) PORTABLE ADJUSTABLE WORK SURFACE

(76) Inventor: Robert Mayben, 5125 Golden Creek Dr., Angels Camp, CA (US) 95222

(*) Notice: Subject to any disclaimer, the term of this patent is extended or adjusted under 35 U.S.C. 154(b) by 862 days.

(21) Appl. No.: 11/604,192

(22) Filed: Nov. 21, 2006

(65) Prior Publication Data

US 2007/0131149 A1    Jun. 14, 2007

Related U.S. Application Data

(63) Continuation-in-part of application No. 11/221,465, filed on Nov. 21, 2005, now abandoned.

(60) Provisional application No. 60/609,061, filed on Sep. 9, 2004.

(51) Int. Cl.
*A47B 3/00* (2006.01)

(52) U.S. Cl. .................................. 108/129

(58) Field of Classification Search ............... 108/97, 108/98, 152, 42, 6, 9; 248/228.6, 230, 6, 248/231.71, 462, 447.2
See application file for complete search history.

(56) References Cited

U.S. PATENT DOCUMENTS

| | | | | |
|---|---|---|---|---|
| 853,184 | A * | 5/1907 | Miller | 248/454 |
| 979,070 | A * | 12/1910 | Hoffman | 248/447.2 |
| 1,236,050 | A * | 8/1917 | Caldwell | 248/442.2 |
| 1,282,489 | A * | 10/1918 | Strodel | 248/457 |
| 2,580,855 | A | 1/1952 | Sloan | |
| 3,106,376 | A * | 10/1963 | Scott | 248/447.2 |
| 3,126,226 | A * | 3/1964 | Johnson | 297/174 CS |
| 5,281,001 | A * | 1/1994 | Bergsten et al. | 297/411.24 |
| 5,317,977 | A | 6/1994 | Omessi | |
| 5,377,598 | A | 1/1995 | Kirchner et al. | |
| 5,590,607 | A | 1/1997 | Howard | |
| 5,713,404 | A | 2/1998 | Ladewig | |
| 5,735,222 | A | 4/1998 | Webb | |
| 5,924,807 | A | 7/1999 | Ambrose | |
| 6,042,064 | A * | 3/2000 | Hong | 248/118.5 |
| 6,352,303 | B1 * | 3/2002 | Hope | 297/188.18 |
| 6,527,235 | B1 | 3/2003 | Cotterill | |
| 2001/0003961 | A1 | 6/2001 | Hodge et al. | |
| 2002/0100395 | A1 | 8/2002 | Long | |

* cited by examiner

*Primary Examiner*—José V Chen
*Assistant Examiner*—Matthew W Ing
(74) *Attorney, Agent, or Firm*—John P. O'Banion

(57) ABSTRACT

A portable, detachable desk or table extension is disclosed for use by a person in a wheelchair that may be vertically and angularly adjusted to an optimum height and position for use. The extension has a portable work surface or platform that extends out, away from, and above the surface of the desk or table to which it is attached, so that a user in a wheel chair may pull up to and under it and not be blocked or hindered by the table or desk underneath. The elevation as well as the angle of tilt of the platform may be adjusted for optimum positioning so that the user in a wheelchair may pull up close to and under it. The extension clamps to the table via a pair of vertical supports that collapse down onto the platform for storage.

15 Claims, 9 Drawing Sheets

PORTABLE ADJUSTABLE WORK SURFACE

CROSS-REFERENCE TO RELATED APPLICATIONS

This application is a continuation-in-part of copending application Ser. No. 11/221,465, filed on Sep. 7, 2005, incorporated herein by reference in its entirety, which claims priority from U.S. provisional application Ser. No. 60/609,061 filed on Sep. 9, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to portable work surfaces, and more particularly to portable work surfaces for use by physically impaired persons.

2. Description of Related Art

Many persons having physical impairments spend much of their time in wheelchairs. Unfortunately, even with modern advances in wheelchair technology, many wheelchairs are still large, cumbersome and bulky. The height of a typical table or desk is ordinarily too low to allow a wheelchair to fit under it. As a result, it is often difficult for a person in a wheelchair to comfortably pull up to and under the table or desk in order to make good use of it. Thus, it is desirable to provide a desk or table extension to make the desk or table more usable by persons in wheelchairs.

One such table extension is disclosed in U.S. Pat. No. 4,384,532. This patent describes an extension that is permanently affixed underneath a table so that the extension may be pulled out and brought up to the same height as the table. Unfortunately, this unit is not portable, and if the table it is attached to is not sufficiently tall to allow a user in a wheelchair to pull up to and under it in the first place, this extension is of little help.

It is therefore desirable to provide a portable, detachable desk or table extension for use by a person in a wheelchair that may be adjusted to a usable height regardless of the height of the desk or table to which it is attached. In particular, it is desirable that the extension extend out a sufficient distance away from the desk or table so that the user in a wheelchair may comfortably pull up to and under it during use. It is also desirable that the extension be pivotally mounted so that it is angularly adjustable (tiltable) to allow a physically impaired user to adjust it to an optimum position for use.

BRIEF SUMMARY OF THE INVENTION

The present invention is an adjustable extension for temporary attachment to a table or desk designed for use by physically impaired (handicapped) persons.

The present invention is a portable, detachable desk or table extension for use by a person in a wheelchair that may be vertically and angularly adjusted to an optimum height and position for use. The extension has a portable work surface or platform that extends out, away from, and above the surface of the desk or table to which it is attached, so that a user in a wheel chair may pull up to and under it and not be blocked or hindered by the table or desk underneath. The elevation as well as the angle of tilt of the platform may be adjusted for optimum positioning so that the user in a wheelchair may pull up close to and under it. The extension clamps to the table via a pair of vertical supports that collapse down onto the platform for storage.

An aspect of the invention is a portable work surface for attachment to a stationary structure having a stationary work surface. The stationary structure generally comprises a desk, table, or like structure. The portable work surface has a platform having a planar work surface, and a pair of spaced apart support members coupled to the platform, wherein the support members are configured to support the platform at an elevation above the stationary work surface. The support members are configured to abut at least partially against a side edge of the stationary structure. At least one bracing member is coupled to the support elements. The bracing member is configured to contact the stationary work surface. Furthermore, at least one clamping member is coupled to the support elements. The clamping member contacts a lower surface of the stationary structure to releasably secure the support members to the stationary structure.

In one embodiment of the current aspect, the platform is coupled to the support members so that the platform is capable of translating with respect to the support members to alter the elevation of the platform with respect to the stationary work surface.

The platform may also be rotatably coupled to the support members so that the platform is capable of rotating with respect to the support elements to alter the angle of the platform with respect to the stationary work surface.

In another embodiment, the support members are configured collapse into a stowed orientation by folding horizontally against a bottom surface of the platform.

Generally, the support members are configured to support the platform at a location in front of the side edge of the stationary work surface.

In another embodiment, a biasing element is disposed between the support member and the platform, wherein the biasing element unloads at least a portion of the platform's weight to facilitate translation of the platform with respect to the stationary work surface.

In one mode, a pair of elevation members coupled to the platform, wherein the support members house the elevation members to facilitate linear translation of the platform in a direction normal to the stationary work surface. Generally, the support members are configured to be secured at an orientation normal to the stationary work surface. In a preferred variation, the elevation members are spring loaded to ease translation of the platform to varying elevations.

A locking mechanism may also be coupled to the support members to lock translation of the elevation members.

Another aspect of the invention is a portable work surface having a platform with a planar work surface. The portable work surface comprises a means for releasably securing the platform to the stationary work surface; and a means for adjusting the elevation and angular orientation of the platform with respect to the stationary work surface so that the platform may be positioned at a location in front of and above the level of the stationary work surface.

In one embodiment of the current aspect, the means for means for releasably securing the platform comprises a pair of adjustable supports that are configured to fold underneath the platform other for storage.

A means for locking and unlocking the elevation and angular orientation of the platform with respect to the stationary work surface may also be included.

In yet another embodiment, a biasing means is coupled to the platform, wherein the biasing means at least partially unloads the weight of the platform when the elevation is unlocked. The biasing means may comprise a spring disposed between the platform and the securing means.

A further aspect is a method of extending a stationary work surface of a stationary object. The method includes the steps of releasably securing a support member to the stationary object, wherein the support member is coupled to a platform having a planar work surface, and positioning the platform at a location forward of and above the stationary work surface.

The method may further include slideably adjusting the elevation of the platform above the stationary work surface, and locking the elevation of the platform with respect to the first and second support members. In addition, at least a portion of the weight of the platform may be unloaded such that application of a force smaller than the weight of the platform adjusts the elevation of the platform.

Furthermore, the method includes detaching the support member and platform from the stationary object, and folding the support member to rest on a bottom surface of the platform.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 11. It will be appreciated that the apparatus may vary as to configuration and as to details of the parts, and that the method may vary as to the specific steps and sequence, without departing from the basic concepts as disclosed herein.

Figure 1:
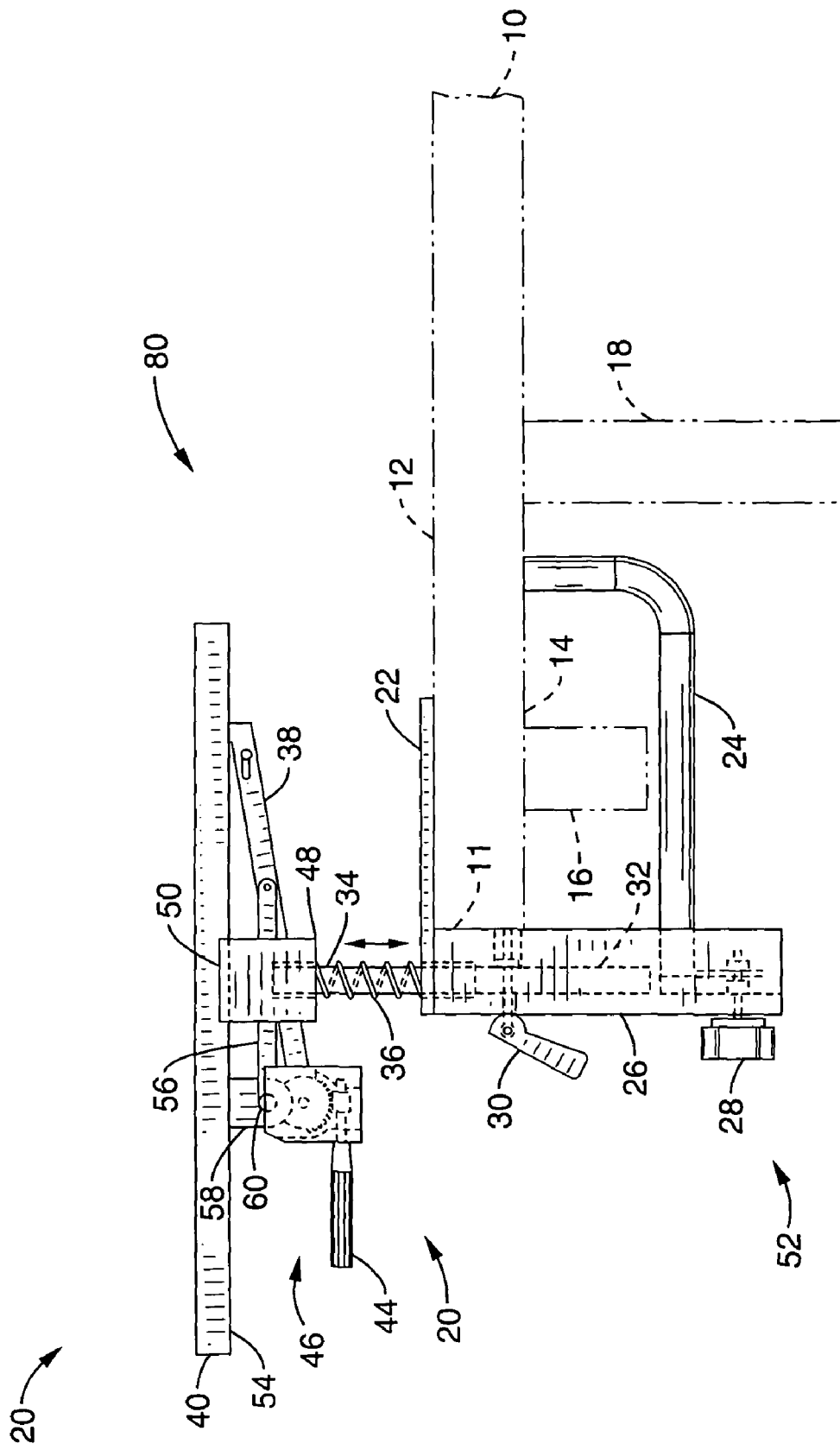
FIG. 1 is a side view of a portable work surface attached to a desk or table in accordance with the present invention.

Referring now to FIG. 1, a portable work surface 20 in accordance with the present in is illustrated attached to a fixed work surface 10, such as a desk, table or the like. The portable work surface 20 provides a platform 40 that raises the effective work surface 12 of the table 10 upward and outward. This change in the effective work surface allows more flexibility for those in wheelchairs, or even users who desire to change the effective work surface for anatomical or other reasons (e.g. the upward disposition of the platform may allow the user to access a keyboard, mouse or other device at a more comfortable anatomical orientation, relieving stress on wrists, shoulders, back, etc.)

Figure 4:
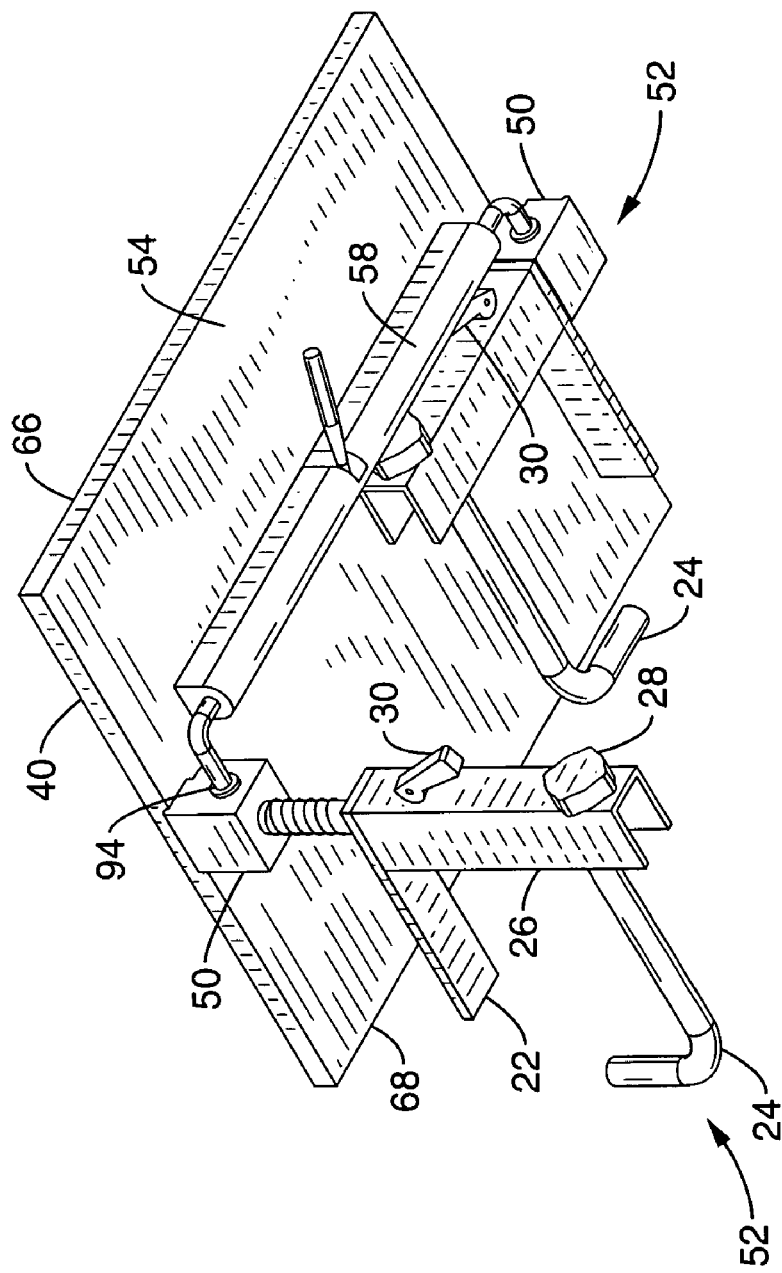
FIG. 4 shows a perspective view of the portable work surface of FIG. 1 with one clamping assembly in a stowed position, and the other clamping assembly positioned for attachment to a table or desk.

Platform 20 generally comprises a flat, planar surface 42. As shown in FIG. 4, the platform is preferably rectangular in shape (although any number of shapes are contemplated), having a thickness sufficient enough to support the expected loading (e.g. keyboard, weight of user's arms while resting, etc.). The platform is preferably constructed of lightweight yet rigid material, e.g. a hard plastic). The platform may also be weight relieved on the bottom surface 54, and may comprise other light-but-rigid constructions (such as a honeycomb core).

Work surface 20 comprises a pair of clamping assemblies 52 (see also FIG. 2) that are configured to releasably attach to the desk 10. Each clamping assembly comprises a vertical support 26 that houses an arm 24 and brace 22. Arm 24 is configured to clamp to the underside 14 of table 10, while brace 22 spans generally horizontally away from support 26 to contact the upper surface 12 of the table 10 to hold the work surface 20 locked in place.

Arm 24 is generally L-shaped so that it may clamp to the table 10 even in the presence of a flashing 16 or other protrusion emanating from the underside 14 of the table 10. Arm 20 is coupled to the vertical support 26 via a knob 28 that allows rotational and vertical (e.g. via clockwise or counter-clockwise tightening) manipulation of the arm 24 to tighten it against tables or desks of varying thickness. The braces 22 provide resistance to the clamping pressure imparted by arms 20 when knobs 28 are tightened.

A brace 22, which generally comprises a flat plate, extends horizontally from the upper end of the vertical support 26 to engage the upper surface 12 of the table or desk 10. Once the arm 24 is properly positioned to contact the underside 14 of the table 10, knob 28 is tightened to lock the portable work surface 20 on to the table 10 and maintain its position with respect to the table, even in the presence of external loading on the portable work surface 20.

Figure 6:
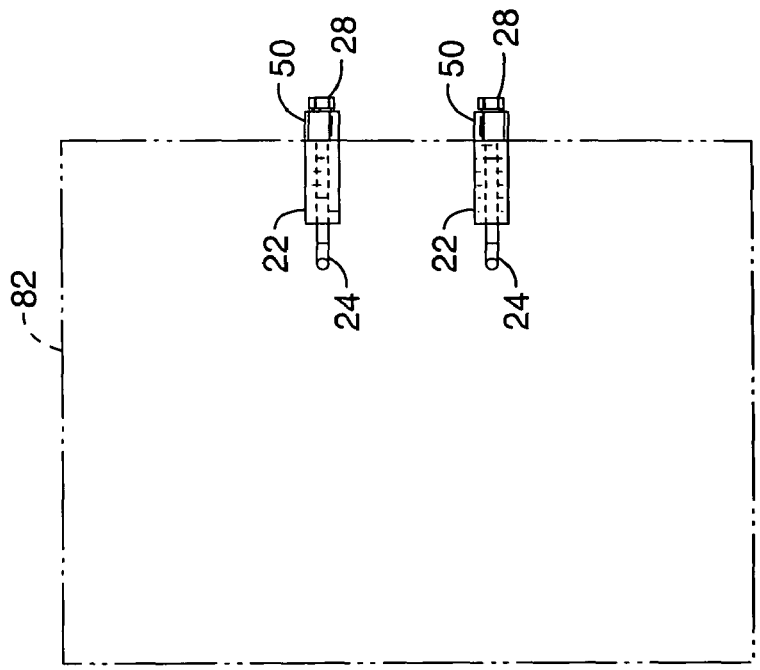
FIG. 6 illustrates the footprint of the clamping assemblies (with platform assembly removed), attached to a rectangular table or desk.
Figure 5:
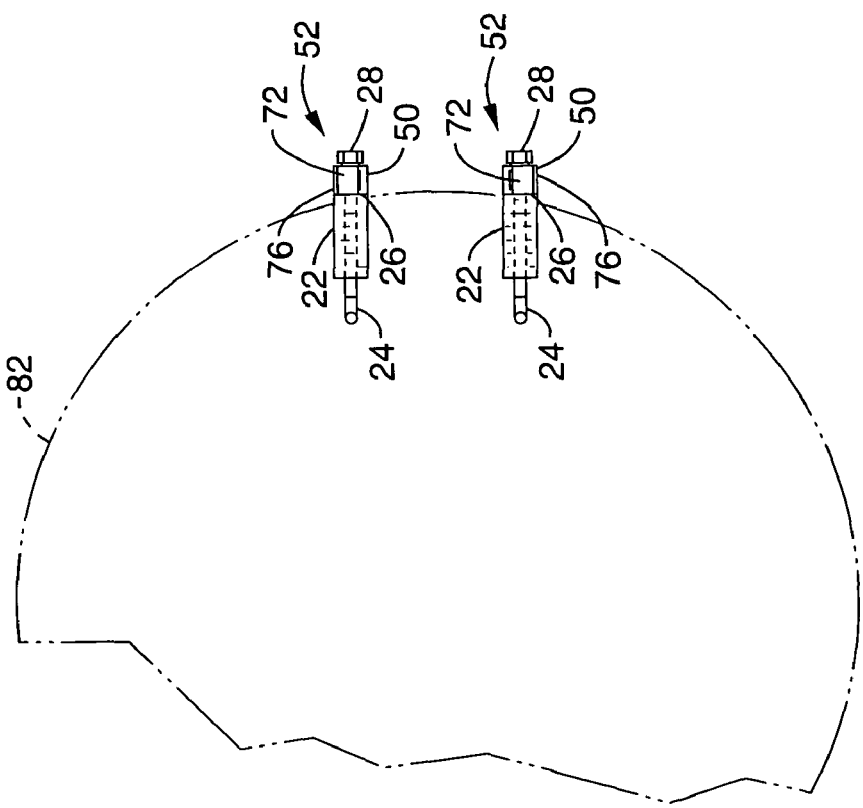
FIG. 5 illustrates the footprint of the clamping assemblies (with platform assembly removed), attached to a circular or oval table.

FIGS. 5 and 6 show top views of the clamping assemblies 52 (with platform assembly 80 hidden) mounted on a circular or oval table 82 (FIG. 5) and rectangular table 84 (FIG. 6). The spaced apart orientation of the clamping assemblies 52 allow the platform 20 to be mounted on a variety of different desk/table configurations, and allow the vertical supports 26 to abut the edge of the table so that the platform 20 does not unduly extend laterally from the table or desk.

Referring back to FIGS. 1-4, each vertical support 26 is coupled to the platform 40 via a support member 50 and elevation rod 34, which is fixedly coupled to the support member 50. The elevation rod 34 is slideably housed in bore 32 that runs vertically down a portion of the length of the vertical support 26. The bore 32 is sized to match (or be slightly larger than) the diameter of the elevation rod 34 so that the rod may move freely within the bore 34 in a vertical and linear fashion. Each rod 34 is retained vertically by a locking member 30, such as a cam lever, or similar quick release mechanism known in the art.

Figure 2:
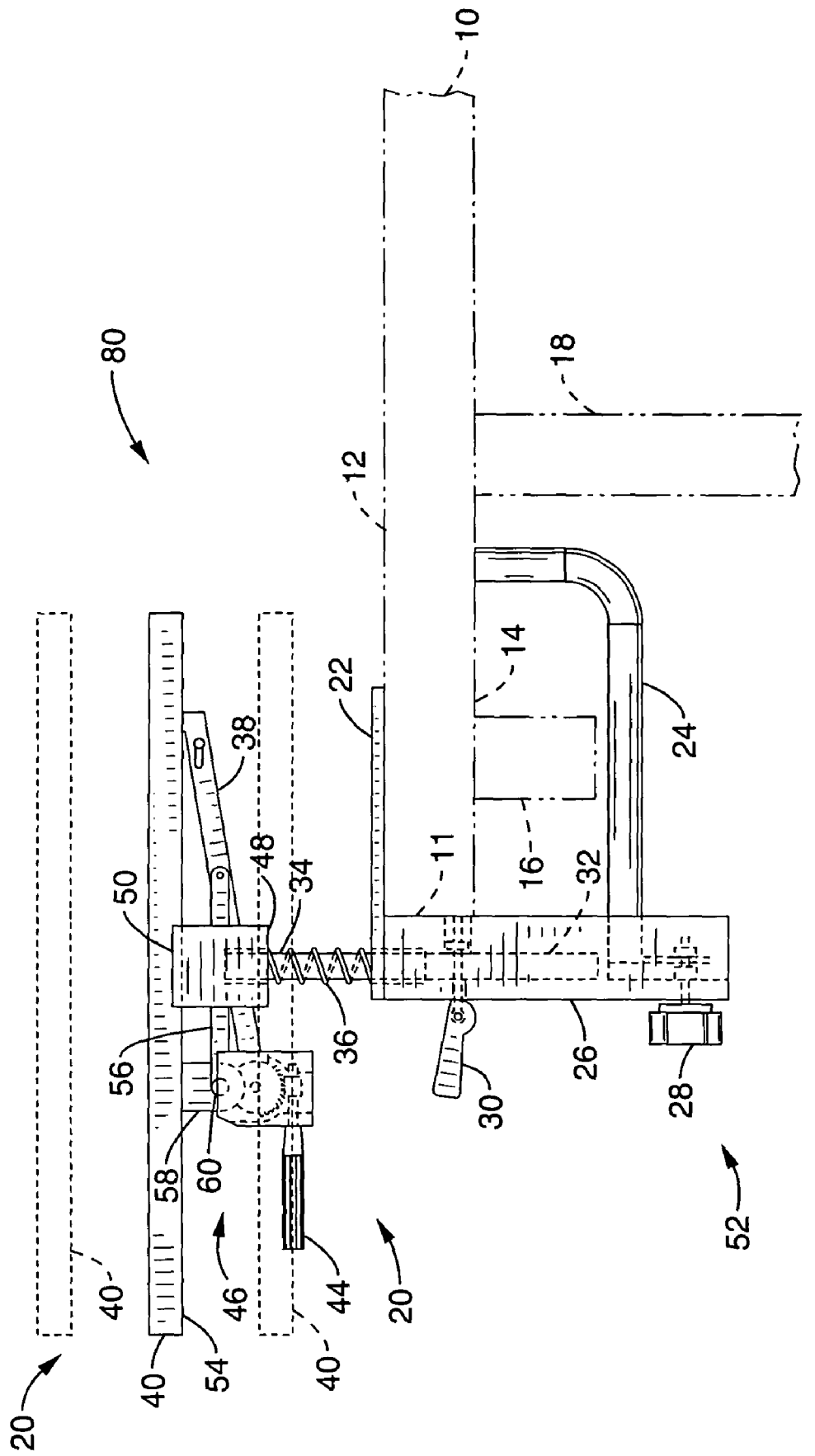
FIG. 2 is a side view of the portable work surface of FIG. 1 with the platform at different elevation levels.

As shown in FIG. 2, by releasing the cam levers 30 (shown as an upward orientation in FIG. 2), the elevation rod 34 is free to move upward or downward in bore 32, which corresponds to an upward or downward translation of the platform 40. In a preferred embodiment, a biasing spring 36 is coupled between the support member 50 and the vertical support 26 to aid the user in adjusting the elevation of the platform 40. As shown in FIG. 2 the biasing spring 36 is located exterior to the elevation rod 34 and is capped at its upper and lower extremities via counter bores 86 and 88 in the vertical support 26 and support member 50. Thus the spring generates an axial force against collapse of the support member 50 (and platform assembly 80) toward the vertical support 26.

Hence, the user merely needs to apply a slight upward force on the platform 40 to effect an upward translation of the platform, and a slight downward force on the platform 40 to effect an downward translation of the platform (both shown in phantom in FIG. 2). Thus, adjustment of the platform 40 elevation may be achieved with one hand, while the other hand is use to unlock/lock the locking members 30.

Spring 36 may be sprung such that the platform, under its own weight, rests at a nominal or intermediate position along its range of travel (e.g. spring resistance at half of compression distance being substantially equal to the weight of the platform assembly 80).

Alternatively, the spring 36 may be under-sprung so that the platform naturally rests at the bottom of its travel (e.g. the support member 50 touching the vertical member 26). In this case, the user simply applies a slight upward force to mover the platform to a higher elevation.

In a further alternative, the spring 36 may be over-sprung so that the platform naturally rests at the top of its travel (e.g. the elevation rod 34 fully extended). In this case, the user simply applies a slight downward force to mover the platform to a lower elevation.

Figure 3:
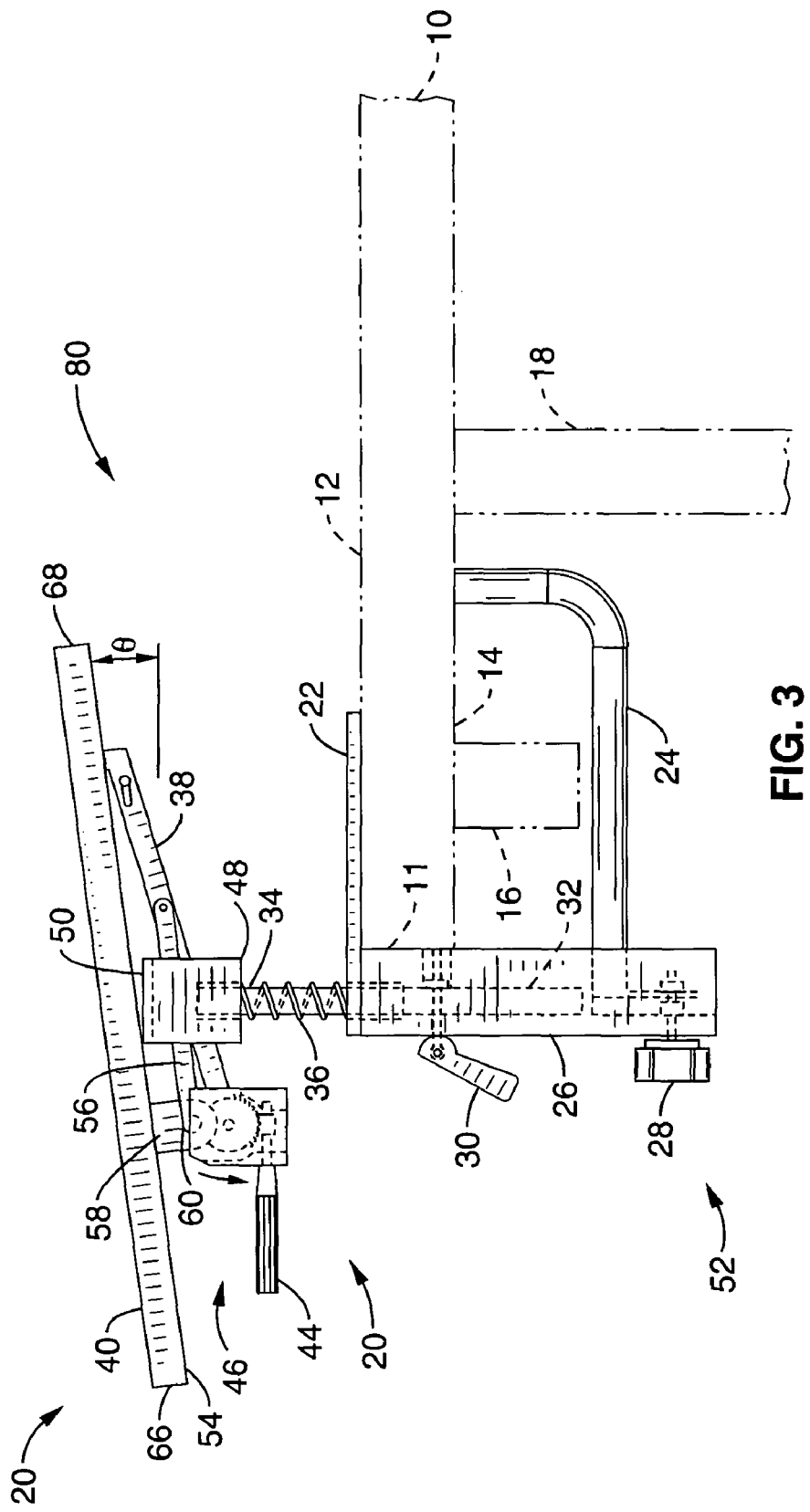
FIG. 3 illustrates the portable work surface of FIG. 1 with the platform oriented at an angle with respect to the table.

Referring now to FIG. 3, the platform assembly 80 is preferably configured such that the platform 40 may be angularly adjusted with respect to the stationary work surface 12. When the platform is oriented at a level or horizontal orientation (as shown in FIGS. 1 and 2), the bottom surface 54 of the platform 40 generally rests on the contact surface 72 of the support member 50 (see FIGS. 7 and 8). Each support member 50 may also have a flange 76 on the outside edge for retaining the sides of the platform.

The support member 50 is also coupled to the platform via a u-shaped hinge 56. The hinge 56 is rotatably coupled to the platform 40 via a housing 58 that is fixed to the bottom surface 54. The hinge 56 runs through the length of the housing 58 substantially parallel to the front edge 66 and back edge 68 of the platform. The hinge 56 protrudes from each side of the housing 58, wherein it curves roughly 90 degrees toward the back edge 68 of the platform 40 to interface with each of the support members 50 (see FIG. 4).

Buy rotation of the inclination knob 44, a gear mechanism 46 drives the platform 40 to rotate about the central axis 60 of the hinge, therefore tilting the back edge 68 of the platform 40 upward so that the platform 40 forms an angle θ with respect to horizontal. Counter-clockwise or clockwise rotation of knob 44 allows for fine adjustment of the angle θ as desired by the user. The Back edge 68 of the platform is supported by strut 38 which is mounted to the bottom surface 54 of the platform 40 by bracket 92.

Figure 8:
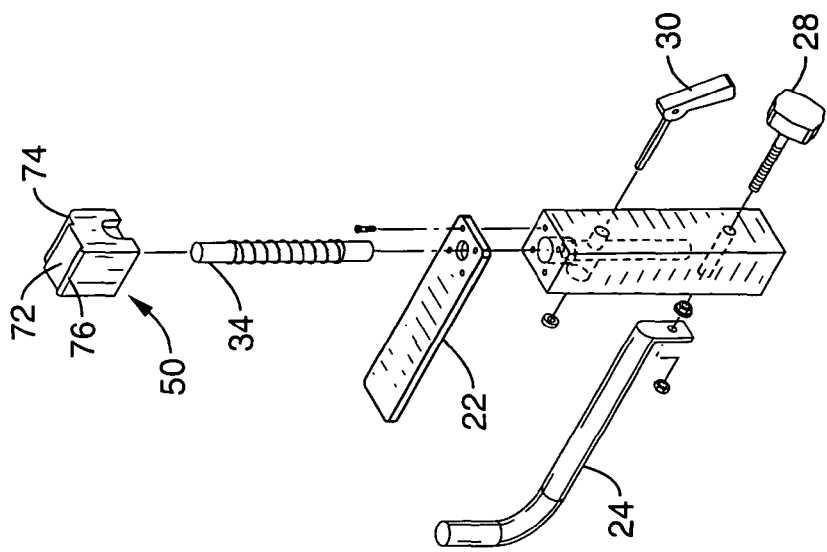
FIG. 8 illustrates a perspective exploded view of the clamping assembly of FIG. 7.
Figure 7:
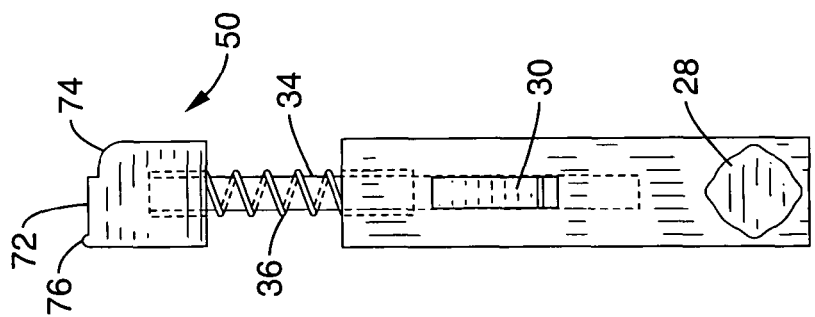
FIG. 7 illustrates a front view of a clamping assembly in accordance with the present invention.

Referring now to FIG. 4, both of the clamping assemblies 52 are configured to be folded down when the portable platform 20 is not in use. The hinge 56 is rotatably coupled to each of the support members 50 via a bushing 94 so that the support member 50 (and clamping assembly 52) can be rotated about the hinge 56 and collapsed inward toward the center of the bottom surface 54 of the platform. As seen in FIGS. 7 and 8, the inner edge 74 of the support members are curved to allow the support member to rotate 90 degrees such that the inner edge rests parallel to the platform lower surface 54.

Figure 9:
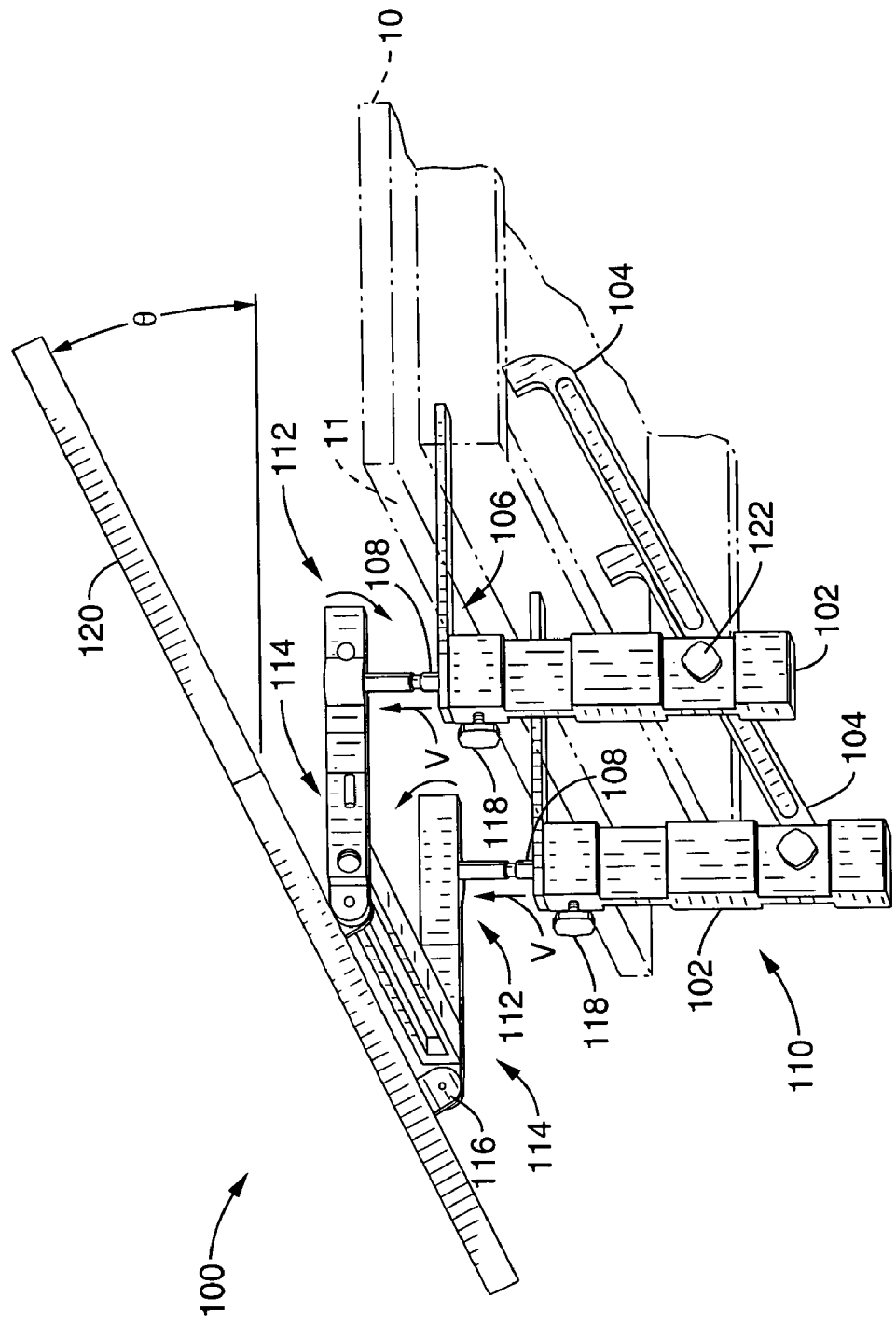
FIG. 9 shows a perspective view of an alternative portable work surface attached to a table in accordance with the present invention.

Referring now to FIG. 9, an alternative embodiment of a portable work surface 100 is illustrated. The portable work surface 100 comprises a clamping assembly 110 having a pair of spaced apart vertical support members 102 that are configured to abut against an edge 11 of table or desk 10. The vertical supports have a pair of braces 106 at their upper extremities for restraint against the upper surface of the table 10. The supports further house a pair of clamp arms 104 that are configured to be tightened to the bottom surface of the table 12. Knobs 122 may be loosened or tightened accordingly to effect adjustment of the arms and corresponding tightening to lock the clamping assembly 110 steadfast to the table 10.

The vertical supports 102 house a pair of elevation members 108 that are vertically oriented inside a bore (see FIG. 1). Knobs 118 allow the elevation members 108 to be locked into position when tightened, and correspondingly allow vertical translation V of the elevation members 108 when loosened. The elevations members 108 are coupled to the platform 120 via a frame 114 and swivel members 112. The frame 114 and swivel members are generally horizontally oriented (e.g. parallel to the upper surface of the table 10 when the portable work surface 100 is installed).

The frame 114 is hingedly coupled to the platform via hinge bracket 116, such that the platform 120 may be rotated upward angle θ with respect to the frame 114 and table 10. Knobs (e.g. or similar to knobs 118, 102), or similar devices known in the art may be used to effect rotation of the platform 120, and tighten it when in the desired orientation.

Figure 10:
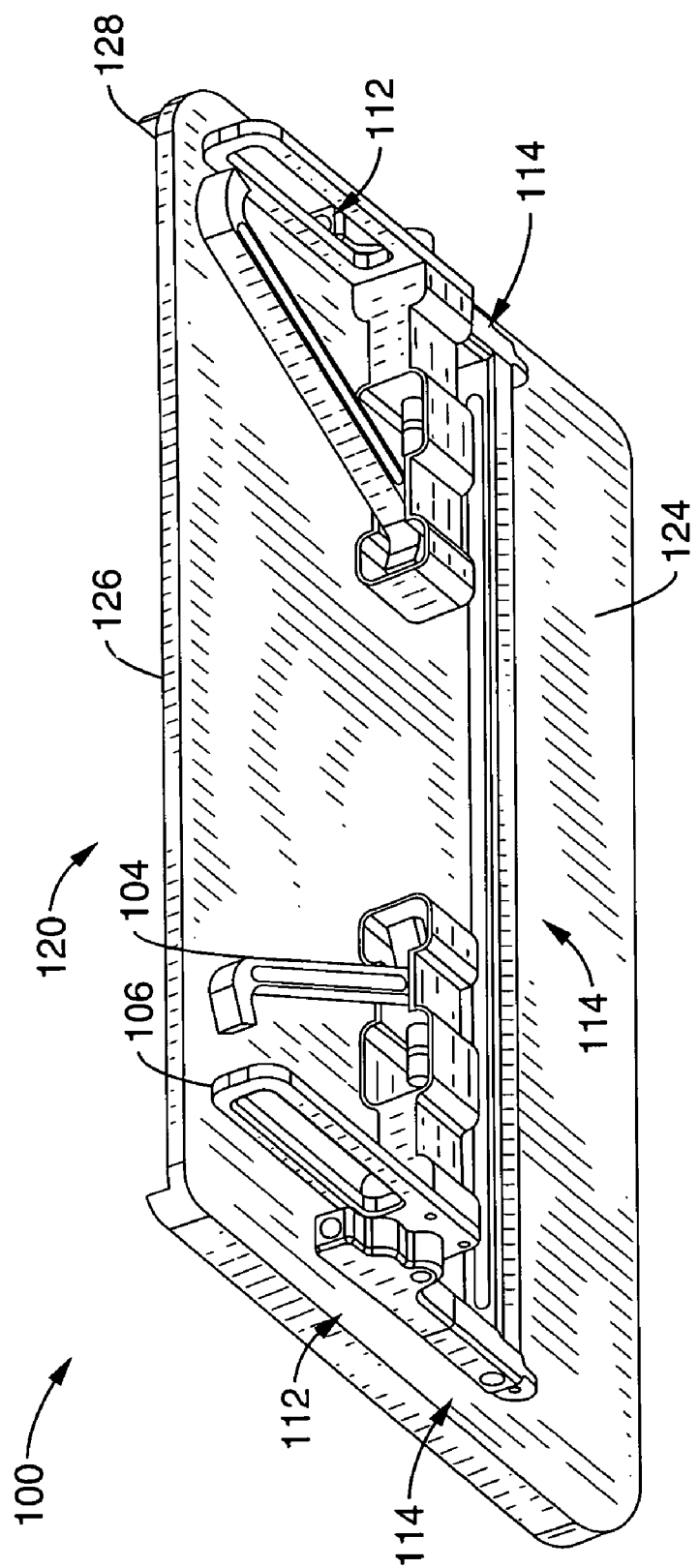
FIG. 10 shows the portable work surface of FIG. 9 in a collapsed configuration.

FIG. 10 illustrates the portable work surface 100 in a stowed orientation. The platform 120 is ideally retracted to a horizontal or parallel position with the frame 114 such that the lower surface of the table 124 is in contact with the frame 112 and or swivel base. With the claming assemblies 110 detached from the desk 10, the swivel bases are allowed to rotate inward (e.g. via hinge, pin 132 or other rotational joint available in the art) toward the bottom surface 124 of the platform 120 to essentially collapse level with the platform 120. This allows the portable work surface 100 to be easily transported or stowed.

As shown in FIG. 10, platform 120 may optionally have an upper surface 126 with raised edges or flanges 128 to retain contents placed on the work surface, and prevent objects from sliding off the panel when it is tilted away from horizontal.

Figure 11:
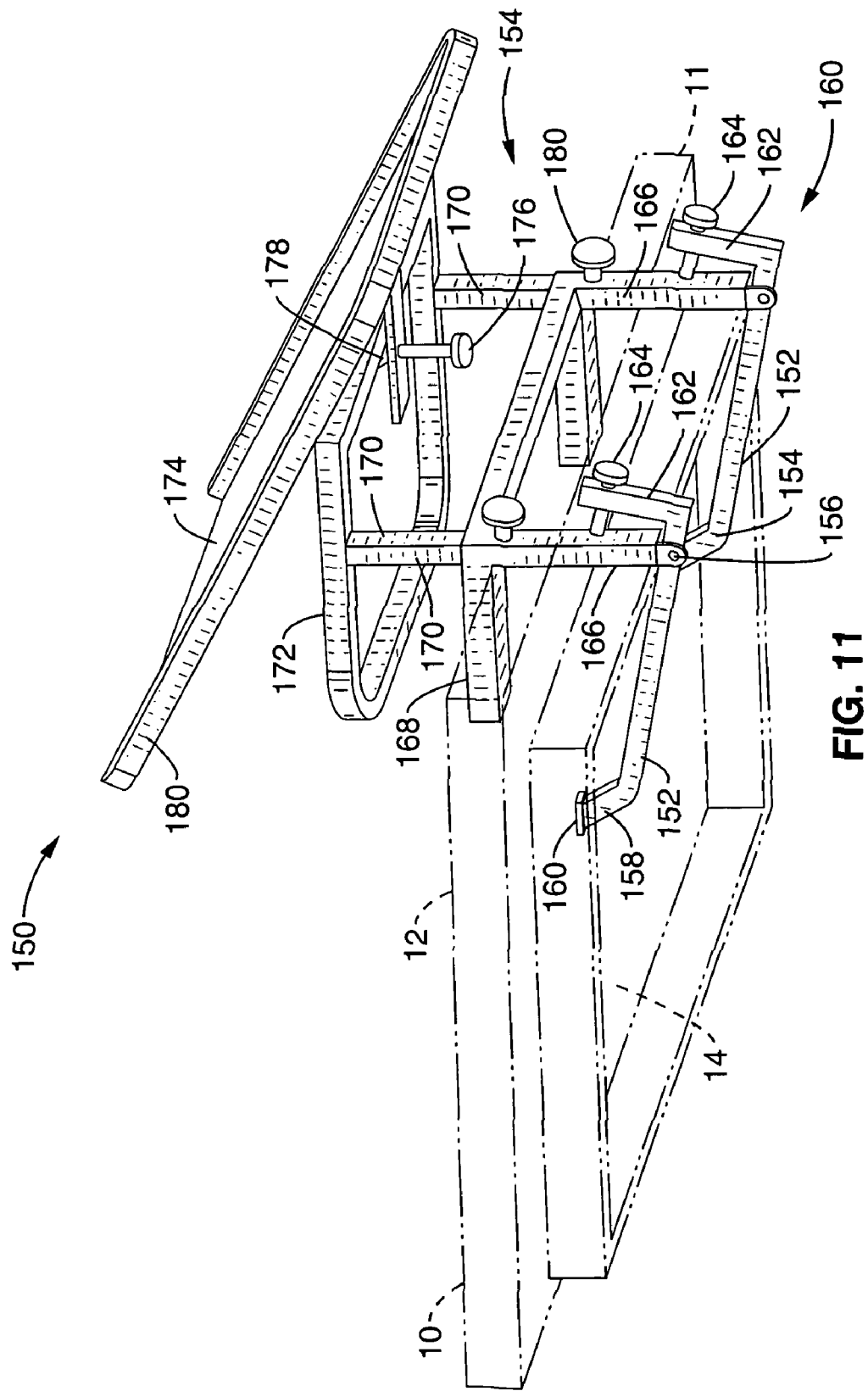
FIG. 11 shows another alternative portable work surface attached to a table in accordance with the present invention.

Referring to FIG. 11, another embodiment of a portable work surface 150 is illustrated having a clamping mechanism 160 for attachment to the edge 11 of a desk or table 10. This clamping mechanism 160 includes a pair of clamping arms 152 that are pivotally attached to a support frame 154 at pivots 156. One end 158 of each arm 152 is bent at an upward angle, and an optional end piece (such as a rubber footing, felt, or a plastic cap) 160 may also be provided.

The opposite end of each arm 152 is provided with a generally orthogonally positioned member 162 through which an adjustable tightening mechanism 164 is attached. Mechanism 164 is preferably provided in the form of a knob attached to a screw member 166 which may be threaded through an opening (not shown) in orthogonal member 162. Each knob may be turned in one direction (e.g., clockwise) to extend screw member 166, thereby causing arm 152 to rotate at pivot (lever) 156, pressing end 158 (and cap 160, if supplied) against the underside 14 of the table 10, thereby tightening the clamping mechanism 160 and securing frame 154 to table 10. Rotating each knob in the opposite direction loosens arm end 158 from the underside of table 10 allowing for removal. The arms 152 of the clamping mechanism 160, and frame 154, should be sufficiently wide so as to allow a wheelchair to pull directly into and between the clamps, so that neither the wheels of the chair nor the knees of the user bump into the clamps or supports.

Support frame 154 includes a pair of generally vertically oriented members 166, to which each of arms 152 is pivotally attached. A pair of generally horizontally oriented upper arms or braces 168 extend out from each vertical support member 166. Each arm 168 extends generally parallel to the top surface of the table 10, and is configured to be positioned and rest on top of the table 10. Thus, arms 166 provide resistance to the clamping pressure imparted by arms 21 when knobs 29 are tightened.

A telescoping member 170 is housed in each of the vertical members 166. The position of each member 170 may be slideably translated along the vertical axis to effect the elevation of the platform 174, and then be fixed by tightening knob 180 attached to member 166. Members 170 support upper frame 172, which is generally rectangular in shape and parallel to surface 12 of the table 10.

Frame 172 provides support the table extension of platform 174. Thus, by loosening knobs 180, telescoping members 170 may be raised or lowered to correspondingly raise or lower upper frame 172 and attached platform 174. This allows platform 174 to be adjusted to a desired height.

One end of panel 174 is hingedly attached to frame 172 so that it may also be tilted at an angle relative to frame 172. In the illustrated embodiment, rotating knob 176 operates a gear mechanism (not shown) that raises or lowers strut 178, thereby raising or lowering platform 174. However, other suitable raising and lowering devices may alternatively be employed. Platform 174 is shown in raised position in FIG. 11. Platform 174 (much like previous embodiments shown in FIGS. 1-10, may be titled at an angle of up to 90 degrees from horizontal (i.e. vertical), but ordinarily will not be raised more than about 45 degrees.

Optional features include a rim 180 extending around all or part of the perimeter of the platform 174. Holders for beverages, writing implements, paper and desk items may also be provided either attached to panel 174, frame 154. The platform 40, 120, 174 may be made of a variety of materials, and may also comprise a laminate structure, e.g. with a layer of an erasable white board for use with colored markers.

Alternatively, platform 40, 120, 174 may be provided with a clear cover that can be written on with an erasable marker. The clear cover may be fitted between the raised outside ridges or flanges 180, and allows for paper to be placed under the clear plastic. This feature is beneficial for persons with severe disabilities (sight, fine motor, etc.) who cannot use a traditional pencil and paper, and allows such persons to grasp a larger writing utensil and write on the large surface that can be color coded to enhance usability and performance. Paper may also be placed under the clear plastic if the user is unable to hold the paper on the tabletop extension. Such paper may be blank, or it may be provided with lines or staffs so that it may be followed, or with other objects to be or traced.

Clamp assemblies 52, 110, and 160, and their respective members as well as frames, and their respective members may be made of plastic, metal, wood, other suitable materials known in the art. Any of the securing mechanisms 28, 30, 118, 122, 164, or 176 may be replaced by cranks, handles or other suitable structures for easier grasping and rotation by a physically impaired person.

As an alternative to the securing mechanisms 30, 118, and 180, a series of openings may be provided along vertically oriented support members 26, 102, 166, and elevation/telescoping members 34, 108, 170 may be provided with depressible spring biased buttons that pop-out and lock into one of said openings to hold each of telescoping members in place. It is also appreciated that the present invention may comprise any combination of individual elements of the embodiments disclosed in FIGS. 1-11.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A portable work surface for attachment to a stationary structure, the stationary structure having a stationary work surface, comprising:

a platform having a planar work surface, and a lower surface opposite the planar work surface;

a hinge comprising a hinge member rotatably attached to the lower surface of the platform;

the hinge comprising first and second arms extending at an angle substantially orthogonal to the hinge member;

a first support member rotatably attached to said first arm, and a second support member rotatably attached to said second arm;

wherein said first and second support members are configured to support the platform at an elevation above the stationary work surface;

a first vertical support coupled to said first support member, and a second vertical support coupled to said second support member;

wherein said first and second vertical supports are configured to abut at least partially against a side edge of the stationary structure;

a first bracing member coupled to the first vertical support, and a second bracing member coupled to the second vertical support;

wherein the said first and second bracing members are each configured to contact the stationary work surface; and a first clamping member coupled to the first vertical support, and a second clamping member coupled to the second vertical support;

wherein said first and second clamping members are each configured to contact a lower surface of the stationary structure to releasably secure the first and second vertical supports to the stationary structure;

wherein the first and second support members are configured to rotate about the first and second arms of the hinge such that the first and second support members and first and second vertical supports collapse into a stowed orientation horizontally against the lower surface of the platform.

2. A portable work surface as recited in claim 1, wherein the first and second vertical supports are slideably engaged within to the members so that the platform is capable of translating with respect to the first and second vertical supports to alter the elevation of the platform with respect to the stationary work surface.

3. A portable work surface as recited in claim 1, wherein the platform is configured to rotate about the hinge;

the hinge having an axis of rotation offset from the first and second support members such that the platform rotates vertically upward from the first and second support members to alter the angle of the platform at an inclined plane with respect to the stationary work surface.

4. A portable work surface as recited in claim 1, wherein the first and second vertical supports are configured to support the platform at a location in front of the side edge of the stationary work surface.

5. A portable work surface as recited in claim 2, further comprising:

a first and second biasing elements respectively disposed between first and second the support members and the first and second vertical supports;

wherein the first and second biasing elements each unloads at least a portion of the platform's weight to facilitate translation of the platform with respect to the stationary work surface.

6. A portable work surface as recited in claim 1, further comprising:

first and second elevation members respectively coupling the first and second support members to the first and second vertical supports;

wherein the first and second vertical supports are configured to be secured at an orientation normal to the stationary work surface; and wherein the first and second vertical supports slideably house at least a portion of the first and second elevation members first and second to facilitate linear translation of the platform in a direction normal to the stationary work surface.

7. A portable work surface as recited in claim 6, wherein first and second biasing elements are disposed around the first and second elevation members, the first and second biasing elements having ends respectively engaging the first and second support members respectively and first and second vertical supports.

8. A portable work surface as recited in claim 6, further comprising:

a locking mechanism coupled to the first and second vertical supports;

wherein the locking mechanism locks translation of the first and second elevation members.

9. A portable work surface as recited in claim 1, wherein the stationary structure comprises a desk.

10. A portable work surface as recited in claim 1, wherein the stationary structure comprises a table.

11. A portable work surface as recited in claim 3, further comprising:

a gear mechanism coupling the hinge to the platform;

the gear mechanism configured to allow adjustment of the angle of the platform with respect to the stationary work surface.

12. A portable work surface as recited in claim 11, wherein the gear mechanism is configured to hold the platform suspended at an elevated angle above the first and second support members.

13. A portable work surface as recited in claim 3:

wherein the hinge member comprises ends that span a distance corresponding to a distance between the first and second support members; and wherein the ends of the hinge member bend to form a u-shaped member having said arms.

14. A portable work surface as recited in claim 3:

wherein the first and second support members rotate along an axis perpendicular to the axis of rotation of the hinge.

15. A portable work surface as recited in claim 1, wherein the first and second support members have a chamfered edge to facilitate rotation of the first and second support members while positioned adjacent to the lower surface of the platform.

* * * * *